(12) United States Patent
Taylor et al.

(10) Patent No.: US 10,684,522 B2
(45) Date of Patent: Jun. 16, 2020

(54) ELECTROCHEMICAL MIRROR SYSTEM AND METHOD

(71) Applicant: Faraday Technology, Inc., Englewood, OH (US)

(72) Inventors: E. Jennings Taylor, Troy, OH (US); Holly M. Garich, Fairborn, OH (US); Maria E. Inman, Yellow Springs, OH (US)

(73) Assignee: Faraday Technology, Inc., Englewood, OH (US)

( * ) Notice: Subject to any disclaimer, the term of this patent is extended or adjusted under 35 U.S.C. 154(b) by 22 days.

(21) Appl. No.: 16/122,312

(22) Filed: Sep. 5, 2018

(65) Prior Publication Data

US 2020/0026138 A1 Jan. 23, 2020

Related U.S. Application Data

(60) Provisional application No. 62/595,824, filed on Dec. 7, 2017.

(51) Int. Cl.
| | |
|---|---|
| *G02F 1/1506* | (2019.01) |
| *G02F 1/155* | (2006.01) |
| *G02F 1/163* | (2006.01) |
| *C25D 5/18* | (2006.01) |
| *G02F 1/1523* | (2019.01) |

(52) U.S. Cl.
CPC .............. *G02F 1/1506* (2013.01); *C25D 5/18* (2013.01); *G02F 1/155* (2013.01); *G02F 1/1525* (2013.01); *G02F 1/163* (2013.01); *G02F 2001/1555* (2013.01); *G02F 2201/12* (2013.01)

(58) Field of Classification Search
CPC ....... C25D 5/18; G02F 1/1506; G02F 1/1525; G02F 1/163; G02F 1/155; G02F 2201/12; G02F 2001/1555
USPC .................................................. 359/265–275
See application file for complete search history.

(56) References Cited

U.S. PATENT DOCUMENTS

| | | | |
|---|---|---|---|
| 5,880,872 A * | 3/1999 | Udaka ................... | G02F 1/1506 359/273 |
| 6,111,685 A * | 8/2000 | Tench ................... | G02F 1/1506 359/267 |
| 6,203,684 B1 | 3/2001 | Taylor et al. | |

(Continued)

*Primary Examiner* — Tuyen Tra
(74) *Attorney, Agent, or Firm* — Iandiorio Teska & Coleman, LLP

(57) ABSTRACT

A system and method of operating an electrochemical mirror for reversibly controlling the propagation of electromagnetic radiation. The mirror preferably includes a first electrode transmissive substrate which is substantially transparent to the electromagnetic radiation, a second electrode, and an electrolyte containing metal ions between the pair of electrodes. A first cathodic potential is applied across the electrodes to cause the metal ions from the electrolyte to electrodeposit a mirror film on the first electrode transmissive substrate. A second anodic potential is applied across the electrodes to oxidize and strip the metallic mirror film from the first electrode transmissive electrode. After a plurality of deposition and stripping cycles, a cleaning cycle is initiated to remove undissolved reflective material on the first electrode preferably by applying a third potential across the first and second electrodes which is increased to a fourth potential and then decreased back to the third potential.

22 Claims, 11 Drawing Sheets

(56) References Cited

U.S. PATENT DOCUMENTS

| | | | |
|---|---|---|---|
| 6,210,555 B1 | 4/2001 | Taylor et al. | |
| 6,303,014 B1 | 10/2001 | Taylor et al. | |
| 6,309,528 B1 | 10/2001 | Taylor et al. | |
| 6,319,384 B1 | 11/2001 | Taylor et al. | |
| 6,400,491 B1 | 6/2002 | Tench et al. | |
| 6,402,931 B1 | 6/2002 | Zhou et al. | |
| 6,524,461 B2 | 2/2003 | Taylor et al. | |
| 6,552,843 B1 | 4/2003 | Tench et al. | |
| 6,558,231 B1 | 5/2003 | Taylor | |
| 6,652,727 B2 | 11/2003 | Taylor et al. | |
| 6,750,144 B2 | 6/2004 | Taylor | |
| 6,798,556 B2 | 9/2004 | Tench et al. | |
| 6,827,833 B2 | 12/2004 | Taylor et al. | |
| 6,863,793 B2 | 3/2005 | Taylor et al. | |
| 6,878,259 B2 | 4/2005 | Taylor et al. | |
| 7,317,566 B2 * | 1/2008 | Tench | G02F 1/155 204/290.14 |
| 9,006,147 B2 | 4/2015 | Taylor et al. | |
| 2006/0012293 A1 | 1/2006 | Warner et al. | |

* cited by examiner

ELECTROCHEMICAL MIRROR SYSTEM AND METHOD

RELATED APPLICATIONS

This application claims benefit of and priority to U.S. Provisional Application Ser. No. 62/595,824 filed Dec. 7, 2017, under 35 U.S.C. §§ 119, 120, 363, 365, and 37 C.F.R. § 1.55 and § 1.78, which is incorporated herein by this reference.

GOVERNMENT RIGHTS

This invention was made with U.S. Government support under Contract No. FA9453-16-M-0466 and FA945317C0490 awarded by the U.S. Air Force. The Government may have certain rights in the subject invention.

FIELD OF THE INVENTION

This subject invention relates to reversible electrochemical mirrors.

BACKGROUND OF THE INVENTION

Reversible electrochemical mirrors can be used to alternatively reflect or transmit light and thus are useful in building windows, automotive mirrors, on orbital platforms, and the like. See U.S. Pat. No. 6,400,491.

An electrochemical mirror typically includes a transparent substrate, a transparent conductive working electrode on the transparent substrate, a counter electrode, and an electrolyte material between the working electrode and the counter electrode.

The application of a negative potential across the two electrodes causes electroplating of the metal ions (silver, copper, gold, and the like) on the surface of the working electrode forming a mirror film. Application of a less negative potential or a positive voltage across the working electrode and the counter electrode oxidizes and dissolves the metal mirror film permitting the transmission of radiation through the electrodes, the electrolyte, and the substrate.

BRIEF SUMMARY OF THE INVENTION

In some cases, after numerous such deposition and stripping cycles, however, some of the metallic film formed on the working electrode is not fully removed from the working electrode during the stripping cycle affecting the quality of the mirror during subsequent deposition cycles and the transmissiveness of the working electrode after subsequent stripping cycles. As a result, the life of the mirror is adversely affected.

Featured is a longer life electrochemical mirror. In one preferred embodiment, a cleaning cycle is periodically initiated to remove any undissolved reflective material on the working electrode of the reversible electrochemical mirror to improve the quality of the mirror and the transmissiveness of the working electrode.

Featured is a method of operating an electrochemical mirror for reversibly controlling the propagation of electromagnetic radiation. The mirror may include a first electrode transmissive substrate which is substantially transparent to the electromagnetic radiation, a second electrode, and an electrolyte containing metal ions between the pair of electrodes. By applying a first cathodic potential across the electrodes, the metal ions from the electrolyte electrodeposit a mirror film on the first electrode transmissive substrate. Applying a second anodic potential across the electrodes oxidizes and strips the metallic mirror film from the first electrode transmissive electrode. After a plurality of deposition and stripping cycles, a cleaning cycle is initiated to remove undissolved reflective material on said first electrode.

The cleaning cycle may include applying to the electrodes multi-cyclic voltammetry. For example, a third potential may be applied across the first and second electrodes which is increased to a fourth potential and then decreased back to the third potential. The third and fourth potential may each be the same or different than the first and second electrodeposition and stripping potentials. Increasing the third potential and decreasing the forth potential may occur at a predetermined rate and voltage step for a predetermined number of sweeps between the third and fourth potential. Alternatively, the number of potential sweeps may be determined when the current response resulting from the potential sweeps does not change.

In some examples, the electrolyte is a room temperature ionic liquid. The cleaning cycle is preferably initiated periodically, for example, after less than two hundred deposition/stripping cycles. The first cathodic potential may be a pulsed cathodic potential and the second anodic potential may be a pulsed anodic potential.

Also featured is a electrochemical mirror system for reversibly controlling the propagation of electromagnetic radiation. A first electrode is preferably a transmissive substrate which is substantially transparent to the electromagnetic radiation. There is a second electrode and an electrolyte containing metal ions between the pair of electrodes. A controller subsystem is configured to automatically apply a first preferably cathodic potential across the electrodes to cause the metal ions from the electrolyte to electrodeposit a mirror film on the first electrode transmissive substrate, to apply a second preferably anodic potential across the electrodes to oxidize and strip the metallic mirror film from the first electrode transmissive electrode, and, after a plurality of deposition and stripping cycles, to initiate a cleaning cycle to remove undissolved reflective material on the first electrode.

Initiating the cleaning cycle preferably includes applying to the electrodes multi-cyclic voltammetry, for example, by applying a third potential across the electrodes which is increased to a fourth potential and then decreased back to the third potential. The controller subsystem may increase the third potential and decrease the forth potential at a predetermined rate and voltage step for a predetermined number of sweeps between the third and fourth potential. Alternatively, the number of potential sweeps may be determined when the current response resulting from the potential sweeps does not change.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
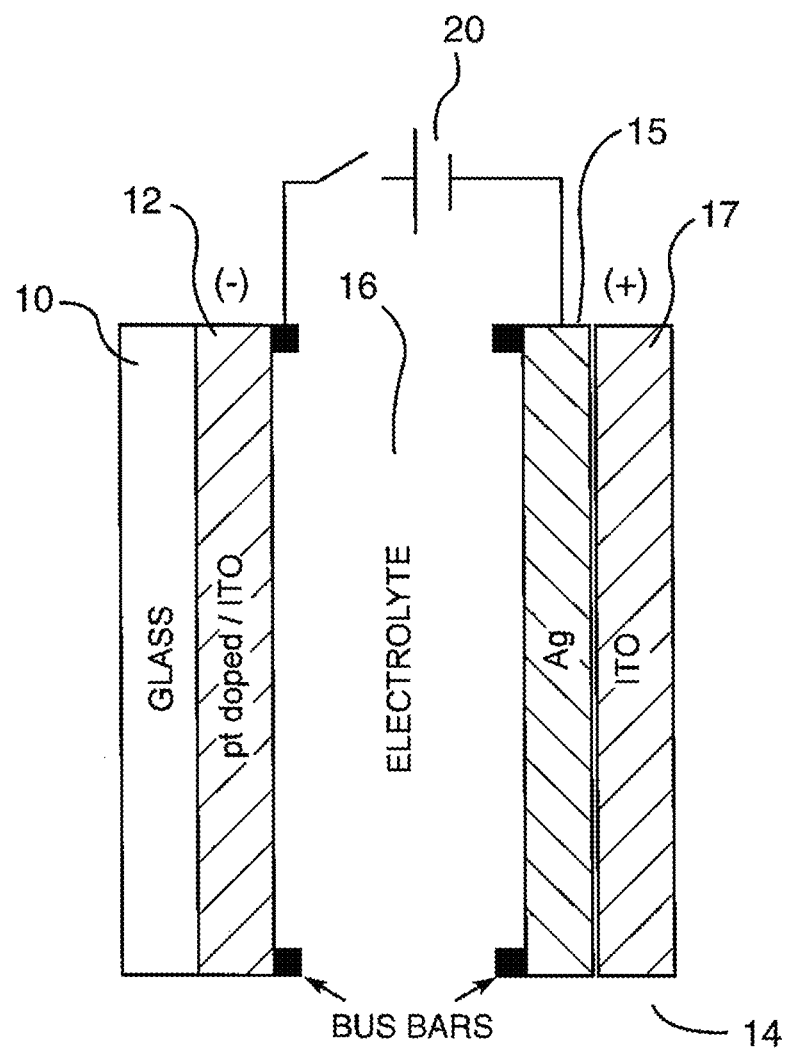
FIG. 1 is a schematic cross-sectional view showing an example of electrochemical mirror in its transmissive state.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows an example of an electrochemical mirror in the transmissive state where transparent (e.g., glass or plastic) substrate 10 includes working electrode 12, counter electrode 14, and electrolyte material 16 containing metal ions between working electrode 12 and counter electrode 14. In one embodiment, the working electrode 12 including a transparent indium doped tin oxide layer (ITO) on substrate 10 with a thin (e.g., 15-30 Å) transparent platinum coating to enhance the conductivity of the ITO working electrode. Other materials may be used to enhance the conductivity including gold and graphene. The counter electrode 14 may be an ITO layer 17 with a 2000-5000 Å silver coating 15. Transmissive counter electrodes may also be used. The electrolyte material may be a room temperature ionic liquid such as 1-butyl-1-methylpyrrolidinium bis(trifluoromethanesulfonyl)imide. See also U.S. Pat. No. 6,552,843 and Published Application No. US 2006/0012293 incorporated herein by this reference. Room temperature ionic liquid (RTIL) electrolytes may also be used.

Figure 2:
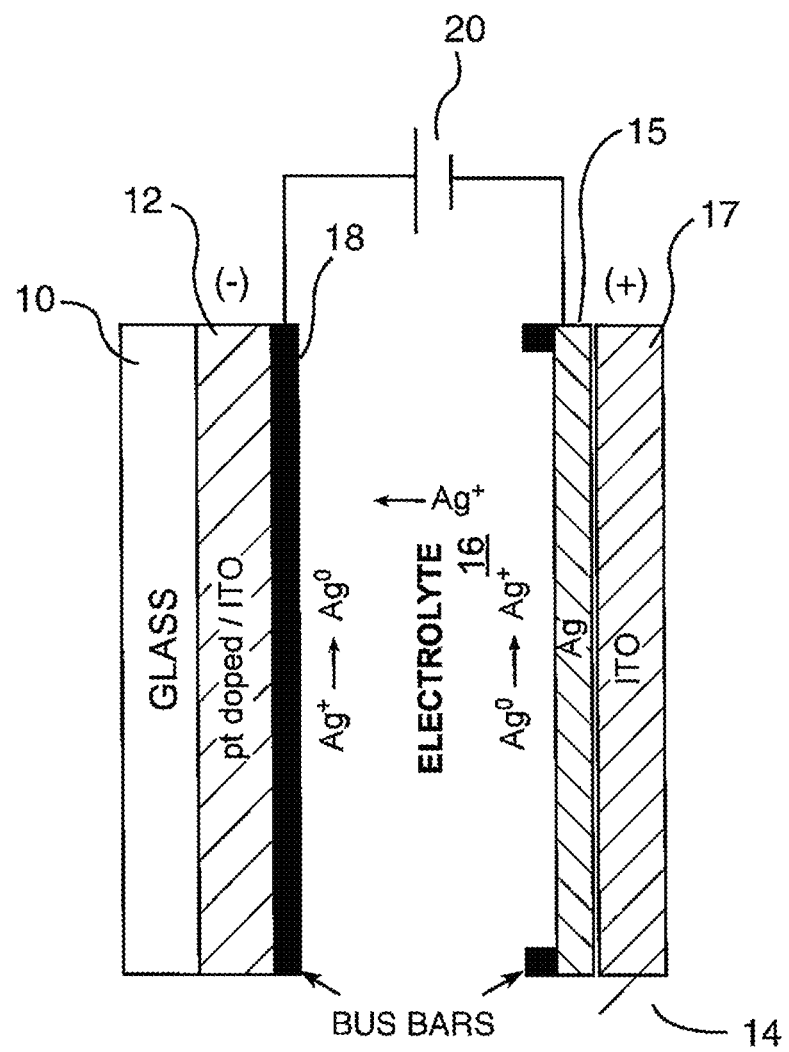
FIG. 2 is a schematic cross sectional view showing an example of an electrochemical mirror in its reflective state.

By applying a voltage using voltage source 20 (e.g., −0.4 to −0.5 V for 60 seconds across electrodes 12 and 14, deposition of a reflective (e.g., silver) layer 18, FIG. 2, was achieved in order to reflect radiation. Other reflective materials including as gold, copper, nickel aluminum and the like. A cathodic potential across the electrodes causes metal ions from the electrolyte to electrodeposit a mirror film on the working electrode. The voltage applied may be constant or pulsed. By applying a voltage of +0.3 to +0.4 V across the electrodes for 75 seconds, for example, the silver mirror 18 was stripped away. See FIG. 1. Applying this second anodic potential across the electrodes oxides and strips the metallic mirror film from the working electrode. During the stripping cycle, a constant or pulsed anodic potential may be applied. During the deposition/stripping cycles, the FARADAYIC® process may be used. See U.S. Pat. Nos. 6,203,684; 6,210, 555; 6,303,014; 6,309,528; 6,319,384; 6,402,931; 6,524, 461; 6,558,231; 6,652,727; 6,750,144; 6,827,833; 6,863, 793; 6,878,259; and 9,006,147 all incorporated herein by this reference.

Figure 3:
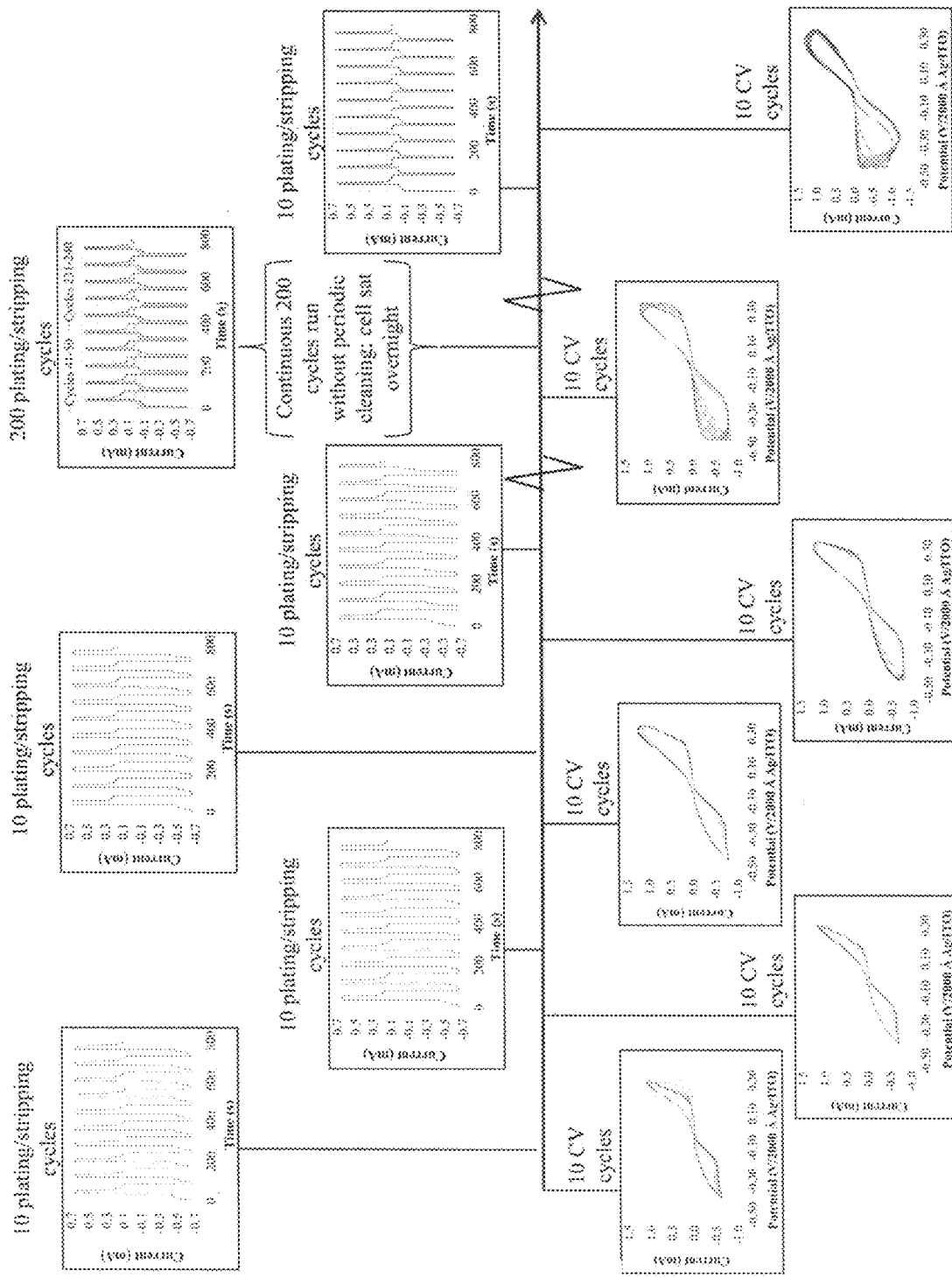
FIG. 3 is a schematic representation of cleaning and deposition/stripping cycles in accordance with aspects of the invention.

In FIG. 3 the times for deposition/stripping were 35 sec deposition and 45 sec for stripping. The range of times (deposition/stripping) would generally be determined to obtain full and smooth reflective substrate coverage with the reflective metal for a given deposition current and substrate area, and obtain substrate transmissivity by reflective metal removal for a given stripping current and substrate area.

Ideally one should be able to measure the deposition "charge density (Coulombs/area)" ((cathodic current/area)× time)) to obtain a reflective mirror surface and then apply the same stripping "charge density" ((anodic current/area)× time)) to effect complete reflective mirror removal. Accordingly, a range of deposition times and stripping times are possible depending on the current and substrate area.

But, after numerous (e.g., 200) deposition and stripping cycles, the appearance of the mirror layer 18, FIG. 2 diminished due to incomplete mirror stripping during the stripping cycle. Also, transmissiveness of the system after a stripping cycle was adversely affected.

FIG. 3 shows several cleaning and deposition/stripping cycles conducted in accordance with aspects of the invention. In one example, a controller subsystem 30, FIG. 4 (with optional electronic circuitry as appropriate) is configured to initiate a cleaning cycle after a plurality of deposition and stripping cycles of the electrochemical mirror 32. The controller subsystem may include one or more processors, one or more memory units, and computer instructions stored in the one or more memory units and executed on the one or more processors. However, application specific integrated circuitry, microcontrollers, programmable gate arrays, and/ or other similar technologies may be used. Typically, the computer instructions are stored in a memory and executed by one or more processors.

Figure 4:
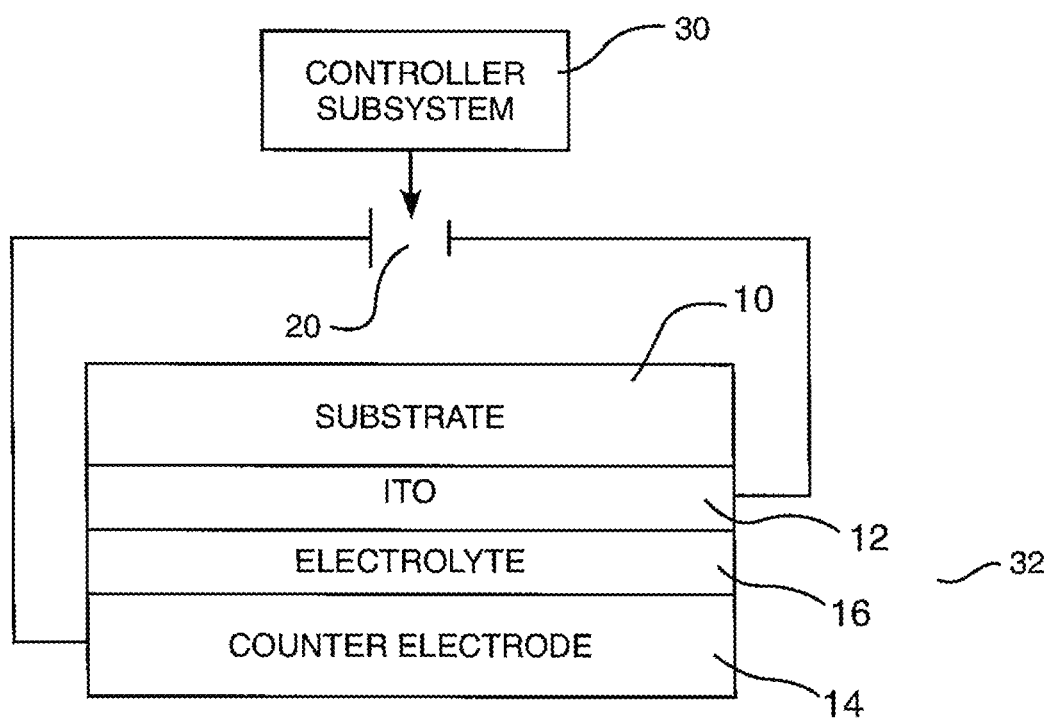
FIG. 4 is a schematic view showing an example of an electrochemical mirror system in accordance with the invention which automatically periodically initiates a cleaning cycle.
Figure 5:
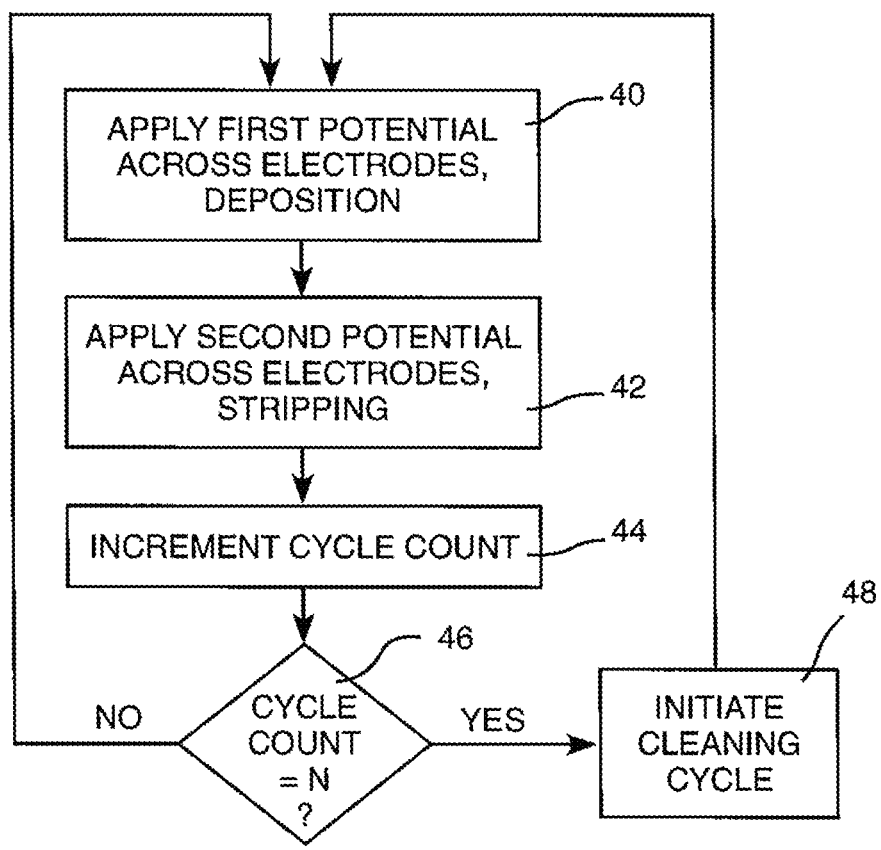
FIG. 5 depicts the primary steps associated with the computer instructions of the controller subsystem of FIG. 4 in order to initiate a cleaning cycle and also depicting the primary steps associated with an example of a method of operating an electrochemical mirror in accordance with an example of the invention.

FIG. 5 depicts the primary aspects associated with the programming of controller subsystem 30, FIG. 4 and also the primary steps associated with an exemplary method in accordance with the invention.

When the controller subsystem 30, FIG. 4 receives a deposition command and/or is programmed to initiate a deposition cycle, the controller subsystem controls voltage source 20 to apply a first potential across electrodes 12 and 14 to form a mirror film 18 on the working electrode 12 as shown in FIG. 2, step 40, FIG. 5. When the controller subsystem 30, FIG. 4 receives a stripping command and/or is otherwise programmed to initiate a stripping cycle, the controller subsystem controls voltage source 20 to apply a second potential across electrodes 12 and 14, step 42, FIG. 5 to strip the metallic mirror film from the working electrode 12 as shown in FIG. 1.

After each deposition and stripping cycle, a count is incremented, step 44 to keep track of the number of deposition/stripping cycles applied to electrochemical mirror 32, FIG. 4. When the count n reaches a predetermined number (e.g., 200 or less), step 46, FIG. 5, controller subsystem 30 initiates a cleaning cycle 48. In one example, the count n in step 46 was 10.

Figure 6:
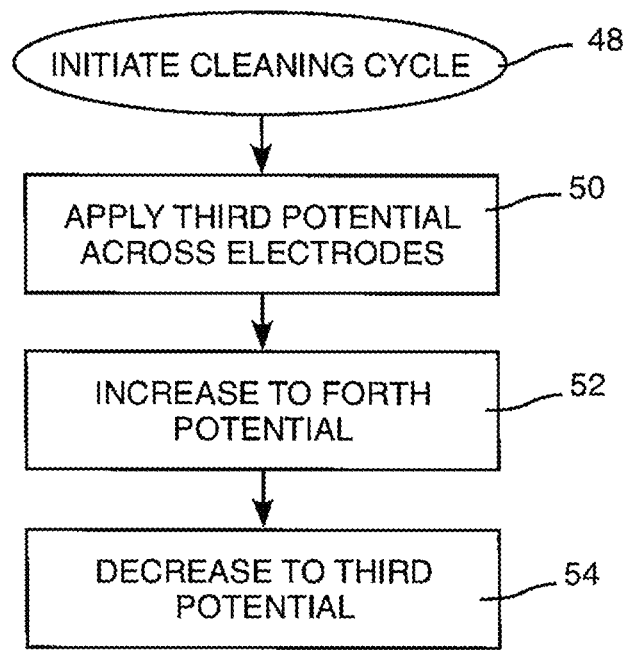
FIG. 6 is a flow chart depicting the primary steps associated with the computer instructions of the controller subsystem of FIG. 4 for an exemplary cleaning cycle and depicting the primary steps associated with a cleaning cycle method in accordance with an example of the invention.
Figure 7:
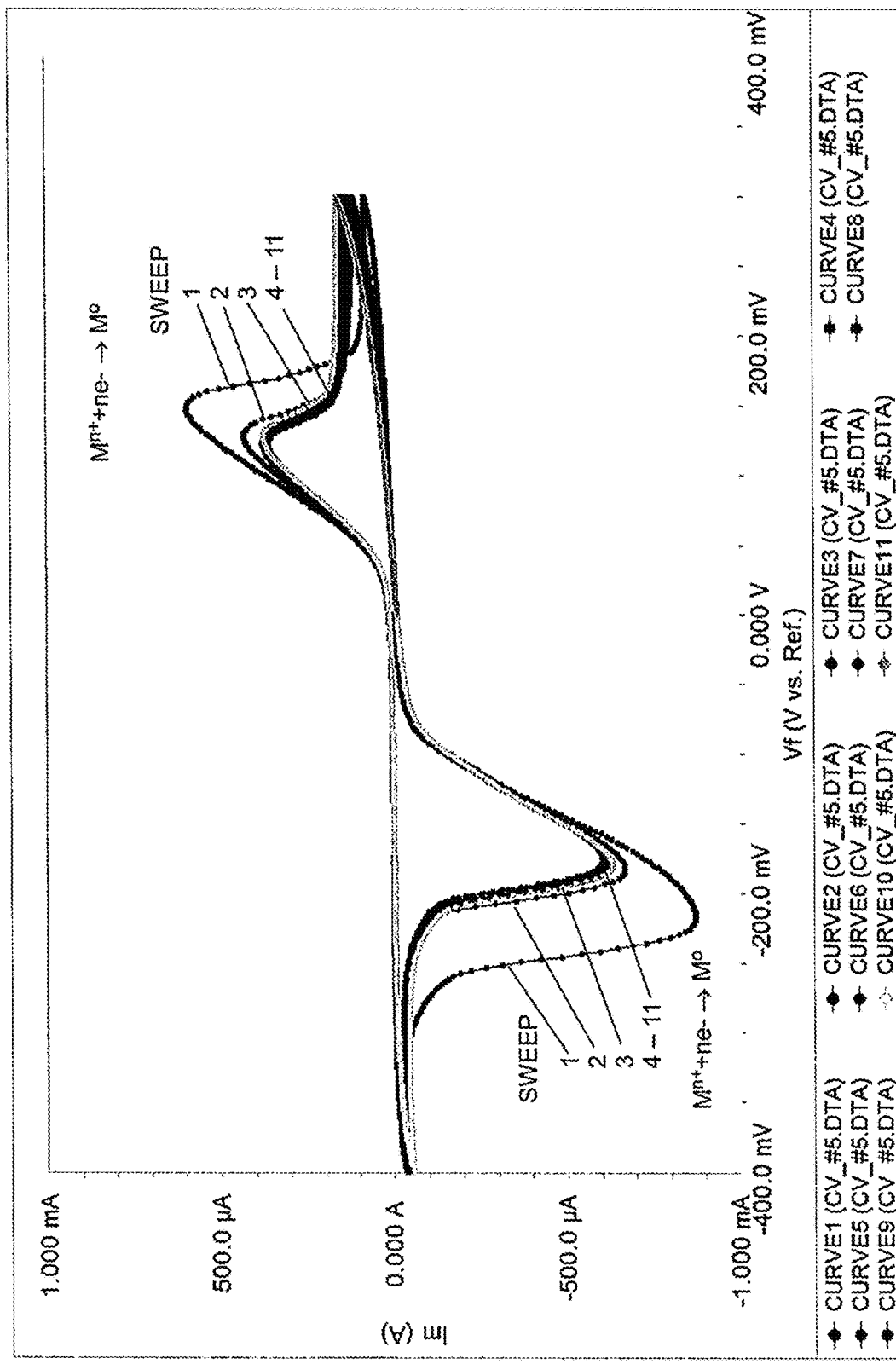
FIG. 7 is the current response for a typical cleaning cycle consisting of 10 sweeps between the third and fourth potential.

During the cleaning cycle as shown in FIG. 6, a third potential is applied across the electrodes, (12, 14, FIG. 4) step 50, FIG. 6 and this third potential is then increased to a fourth potential, step 52. Then, the fourth potential is decreased back to the third potential, step 54. The application of the third potential to the fourth potential and then back to the third potential may be swept in the cathodic direction. The cleaning cycle steps 50-54 may be repeated if necessary, for example, 10 times. Alternatively, the number of sweeps between the third and fourth potential may be determined when the current response resulting from the potential sweeps does not change. In FIG. 7 the current response during 11 sweeps between the third and fourth potential indicates that the current response during the cleaning cycle is stable after 4 sweeps between the third and fourth potential.

The third potential in one example was 0/V to −0.45V/200 Å Ag/ITO, the fourth potential was +0.35V/2000 Å Ag/ITO, and the rate of change between the third and fourth potentials in one example was 25 mV/s at steps of 2 mV. The sweep rate may be between 10 mV/s and 500 mV/s.

In one example, there were 10 cleaning cycles after every ten deposition/stripping cycles. In tests, the ability to achieve 300 deposition/stripping cycles was achieved. The ability to achieve 300 deposition/stripping cycles was achieved using a seal-less cell in a nitrogen purged glove bag utilizing a BMPyrr TFSI-100 mM Ag TFSI electrolyte, using a 15 Å Pt/ITO working electrode, and a 2000 Å Ag/ITO counter/reference electrode. This number of cycles, with nice mirror formation persisting the duration of cycles, was achieved by instituting one or more cleaning cycles after every ten mirror deposition/stripping cycles. Prior to instituting the cleaning regime between tests, no greater than 50 cycles could be achieved with acceptable mirror formation demonstrating the need for periodic cleaning of the electrode surfaces. The incorporation of the cleaning cycle may effectively remove some surface oxide which blocks complete stripping of the silver deposit and/or deposition of an acceptable reflecting mirror which adversely affects device cycling lifetime.

Without the cleaning cycle, undissolved reflective material may remain on the working electrode causing a loss of reflectivity and transmission after about 50 plating/stripping cycles.

In some examples, a highly reflective silver mirror surface was plated onto a 15 Å Pt/ITO mirror electrode. By reversing this process, the mirror can be stripped from the electrode. Note: a 2000 Å silver coated/ITO counterelectrode can be employed as the source of silver for ease of use. However, as this counterelectrode would be opaque, its utility could be an issue for some applications. Instead, a 15 Å Pt/ITO counterelectrode may be used and the source of the silver will be the RTIL electrolyte.

In order to achieve mirror properties on demand and hence thermal control of orbital platforms, the REM device needs to cycle between both reflective and transmissive states or reflective and absorptive states. Deplating of the mirror surface can and has been achieved under constant voltage conditions of the opposite polarity. However, this can result in an opaque counterelectrode by slow deposition of the silver from the RTIL onto the counterelectrode while stripping is occurring on the mirror electrode. This could prevent full transmittance of the radiation through the device.

U.S. Pat. No. 7,317,566 (incorporated herein by this reference) describes an alternate approach based on the use of conductive, microscopic islands, 1 to 5 μm in size, distributed over the transparent conductor on the counter electrode. These microscopic islands become active sites during the stripping portion of the REM plating/stripping cycle, facilitating localized deposition of the metallic mirror species on the counterelectrode, thus preventing the formation of an opaque film across the counterelectrode. These conductive islands, comprised of a noble metal such as platinum, are not visible to the naked eye and must be spaced to maximize transmission through the transparent substrate.

Figure 8:
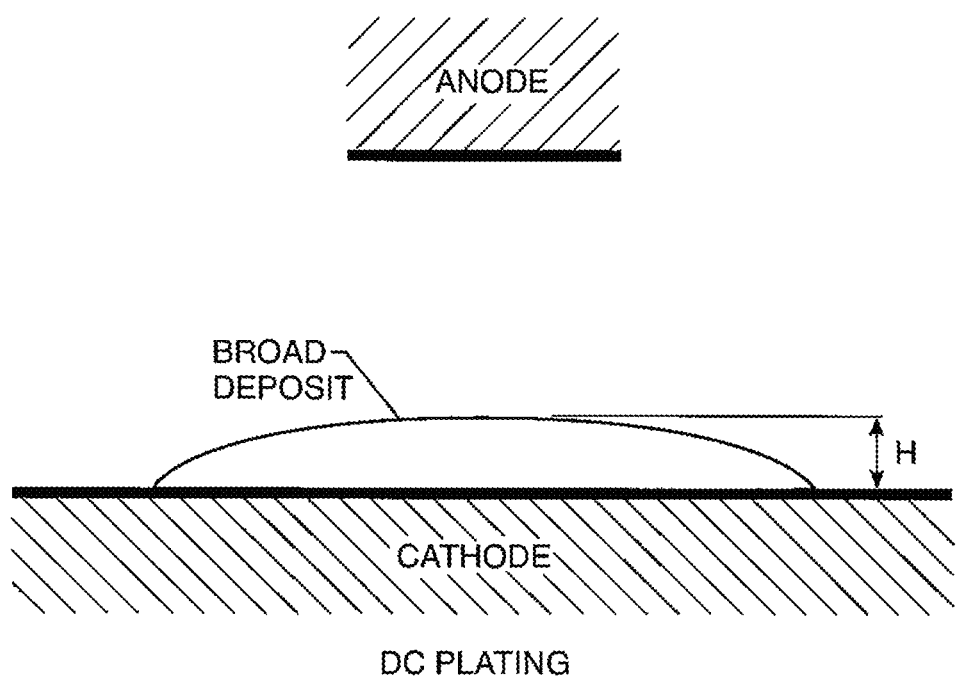
FIG. 8 illustrates the impact of direct current (DC) electrodeposition resulting in a "broad" deposit compared to direct current (DC) electrodeposition.
Figure 9:
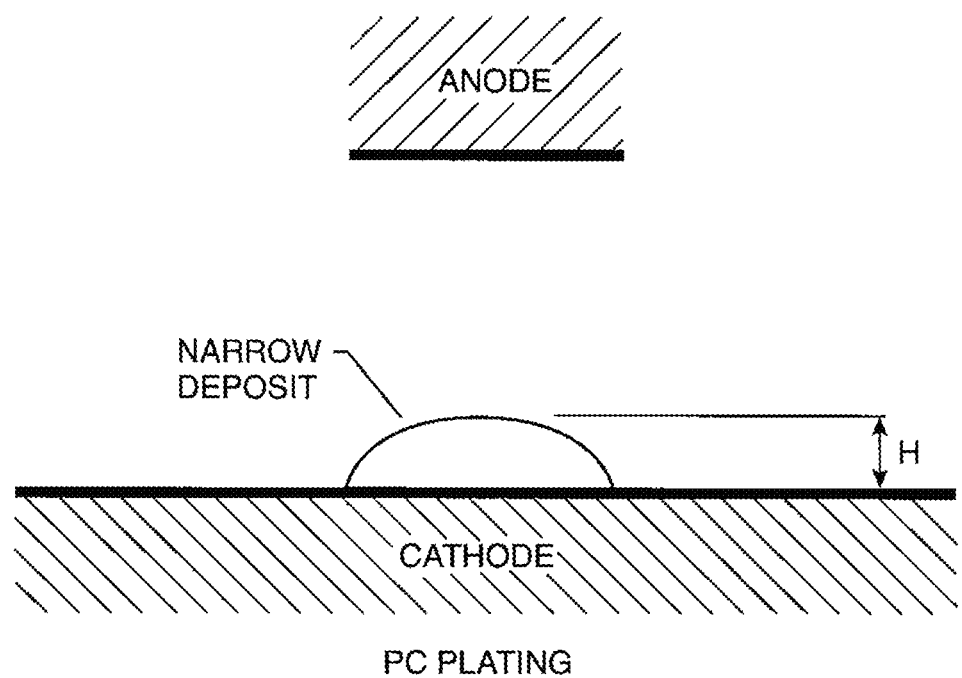
FIG. 9 illustrates the impact of pulse current (PC) electrodeposition resulting in a "narrow" deposit compared to direct current (DC) electrodeposition.
Figure 10:
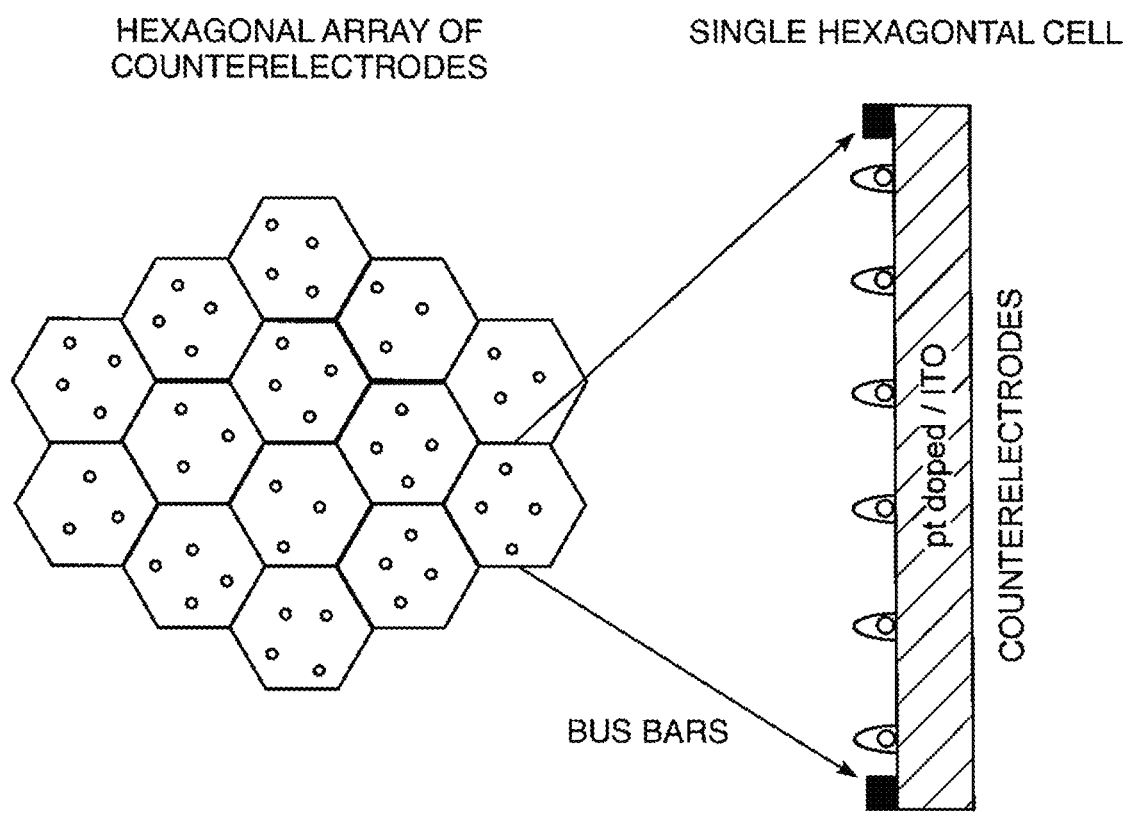
FIG. 10 illustrates the impact of pulse stripping from the mirror electrode while simultaneously pulse electrodepositing on the transparent counter electrode containing conductive islands resulting in a "narrow" deposit and greater than 95% transmission.

Deposition onto these islands under constant voltage control results in broadening of the islands analogous to "bump" plating resulting in ~70% transmission. Use of the FARADAYIC® Process is anticipated to promote higher transmission when compared to operation under steady state conditions. By the application of pulsed voltage control during the transition to the transmissive state (the stripping cycle), we can narrow the islands analogous to "bump" plating and get greater than 95% transmission. FIG. 8 illustrates the impact of direct current (DC) electrodeposition resulting in a "broad" deposit compared to direct current (DC) electrodeposition. FIG. 9 illustrates the impact of pulse current (PC) electrodeposition resulting in a "narrow" deposit compared to direct current (DC) electrodeposition. FIG. 10 illustrates the impact of pulse stripping from the mirror electrode while simultaneously pulse electro depositing on the transparent counter electrode containing conductive islands resulting in a "narrow" deposit and greater than 95% transmission. This is done by tuning the pulsed waveform to focus the current distribution resulting in localization of the deposition reaction on the microscopic islands, which will limit geographical coverage of the deposit on the counterelectrode and enhance device transmission. Conversely, DC steady state processes will result in less localized distribution, which adversely impact transmission and device operation.

Under a pulsed voltage regime, the metallic mirror is stripped from the working electrode surface (here the positive electrode), and is selectively deposited on the counter electrode surface (or the negative electrode during the stripping cycle). The microscopic conductive islands located on the counter electrode serves as deposition sites during the stripping cycle. With use of the appropriate pulse conditions, the deposit on the counter electrode (during the stripping cycle) may be locally grown, and thus leaving most of the transparent electrode surface free in order to optimize device transmission. Conversely, use of a DC steady state process during the stripping cycle would also result in deposition on the counter electrode, however, under these conditions, there is no control over how the deposit forms on the conductive islands. Operation in this manner would result in less localized deposition, and hence the device transmission would be smeared from the lower areas of transparency on the electrode surface.

Also, U.S. Pat. Nos. 7,317,566 and 6,798,556 (incorporated herein by this reference) describe methods to scale REM technology through use of specially designed transparent electrically conductive electrodes. It may be preferred to use the concepts of microscopic conductive islands on the counterelectrode described above, in conjunction with an electrode design that maintains or improves mirror uniformity as the cell is scaled to order of 10 cm×10 cm.

One issue with operation of the REM device is the tendency of the device to be more active at the edges (i.e. near the bus bars) due to the sheet resistance of the substrate. This is a common problem encountered in electrodeposition and stripping reactions and is made more challenging by using substrates of relatively high resistance. A method of grading the thickness of a resistive layer of the device below the Pt doped ITO layer may be used such that the resistive layer is thickest at the device edges and becomes thinner in the center of the device. A counter electrode with spherical noble metal islands is embedded atop the Pt doped ITO layer such that the Pt doped ITO layer is of uniform thickness and the resistive layer is graded to be thicker at the edges of the device closest to the bus bars and thinnest in the center of the device. Operation in this manner is designed to counteract non-uniform operation/deposition reactions, and improves device switching uniformity.

Figure 11:
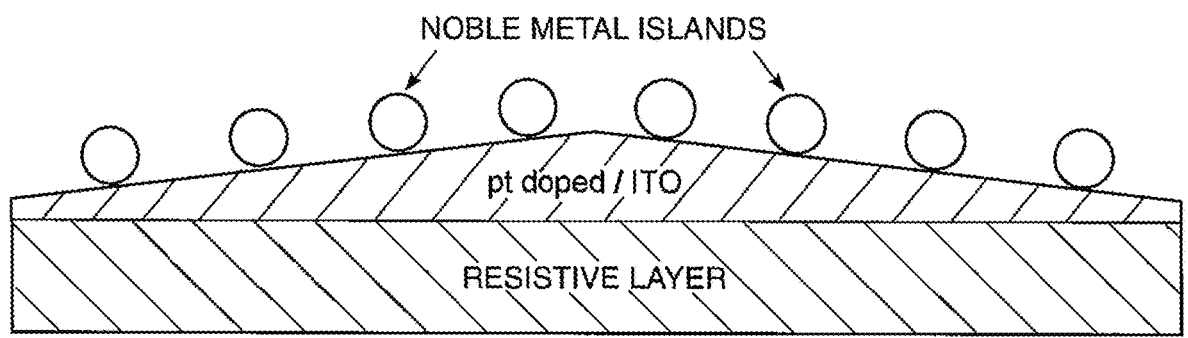
FIG. 11 illustrates the concept of graded thickness of the Pt doped ITO layer.

An alternative method would be to grade the thickness of the Pt doped ITO layer such that it is thickest at the center of the device, to achieve the same effect of uniform current distribution. FIG. 11 illustrates the concept of graded thickness of the Pt doped ITO layer. Note, in both cases, this approach would also work for the mirror electrode, by removal of the spherical islands. Use of the patented FARADAYIC® Process should promote switching uniformity through control of the current distribution by tuning the waveform conditions to drive current to the center of the substrate rather than favoring device edges as is experienced in steady state processing.

Methods are known to achieve localized switching in which only portions of the device are operational on demand. This is achieved by segmenting the working electrode into individually addressable sections that may be reflective or transmissive on demand. Accordingly, working electrodes with appropriately segmented cells in addition to the spherical island counterelectrodes that are anticipated to promote optimized device transmission may be used.

An overlay of a hexagonal grid pattern (in conjunction with conductive spherical islands on the counterelectrode) may substantially decrease the IR drop when scaling the device to CubeSat scales and beyond, which is a considerable issue when using common, electrically conductive transparent electrodes, and improve uniformity. The application of a webbing of thin conductive lines across the surface of the electrodes or by forming an array of hexagonal cells joined by bus bars to improve conductivity and increase efficiency and efficacy of the device.

The FARADAYIC® plating/stripping process is expected to result in both highly reflective, highly transmissive and highly absorptive devices with long cycle life. Use of the FARADAYIC® Process is therefore capable of depositing metallic mirror films anywhere is the spectrum between highly reflective and highly transmission by simple tuning of the applied electric field conditions, on demand.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A method of operating an electrochemical mirror for reversibly controlling the propagation of electromagnetic radiation, the mirror including a first electrode transmissive substrate which is substantially transparent to the electromagnetic radiation, a second electrode, and an electrolyte containing metal ions between the pair of electrodes, the method comprising:
   applying a first cathodic potential across the electrodes to cause the metal ions from the electrolyte to electrodeposit a mirror film on the first electrode transmissive substrate;
   applying a second anodic potential across the electrodes to oxidize and strip the metallic mirror film from the first electrode transmissive electrode; and
   after a plurality of deposition and stripping cycles, initiating a cleaning cycle to remove undissolved reflective material on said first electrode in which said cleaning cycle includes applying to the electrodes multi-cyclic voltammetry.

2. The method of claim 1 in which applying multi-cycle voltammetry includes applying a third potential across the first and second electrodes which is increased to a fourth potential and then decreased back to the third potential.

3. The method of claim 2 in which applying multi-cycle voltammetry includes increasing the third potential and decreasing the fourth potential at a predetermined rate and voltage step.

4. The method of claim 1 in which the electrolyte is a room temperature ionic liquid.

5. The method of claim 1 in which said cleaning cycle is initiated periodically.

6. The method of claim 5 in which said cleaning cycle is initiated after less than two hundred deposition/stripping cycles.

7. The method of claim 1 in which the said first cathodic potential is a pulsed cathodic potential.

8. The method of claim 1 in which the said second anodic potential is a pulsed anodic potential.

9. A method of operating an electrochemical mirror comprising:
   applying a first cathodic potential across electrodes of the mirror electrodeposit mirror film on one electrode;
   applying a second anodic potential across the electrodes to strip the mirror film; and
   after a plurality of deposition and stripping cycles, initiating a cleaning cycle to remove any undissolved reflective material in which initiating said cleaning cycle includes applying to the electrodes multi-cyclic voltammetry.

10. The method of claim 9 in which applying multi-cycle voltammetry includes applying a third potential across the first and second electrodes which is increased to a fourth potential and then decreased back to the third potential.

11. The method of claim 10 in which applying multi-cycle voltammetry further includes increasing the third potential and decreasing the fourth potential at a predetermined rate and voltage step.

12. The method of claim 9 in which said cleaning cycle is initiated periodically.

13. The method of claim 12 in which said cleaning cycle is initiated after less than two hundred deposition/stripping cycles.

14. A electrochemical mirror system for reversibly controlling the propagation of electromagnetic radiation the system comprising:
 a first electrode transmissive substrate which is substantially transparent to the electromagnetic radiation;
 a second electrode;
 an electrolyte containing metal ions between the pair of electrodes; and
 a controller subsystem configured to:
  apply a first cathodic potential across the electrodes to cause the metal ions from the electrolyte to electrodeposit a mirror film on the first electrode transmissive substrate,
  apply a second anodic potential across the electrodes to oxidize and strip the metallic mirror film from the first electrode transmissive electrode, and
  after a plurality of deposition and stripping cycles, initiate a cleaning cycle to remove undissolved reflective material on said first electrode said cleaning cycle includes applying to the electrodes multi-cyclic voltammetry.

15. The system of claim 14 in which applying multi-cycle voltammetry includes applying a third potential across the electrodes which is increased to a fourth potential and then decreased back to the third potential.

16. The system of claim 15 in which applying multi-cycle voltammetry includes increasing the third potential and decreasing the fourth potential at a predetermined rate and voltage step.

17. The system of claim 14 in which the electrolyte is a room temperature ionic liquid.

18. The system of claim 14 in which said controller subsystem is configured to initiate the cleaning cycle periodically.

19. The system of claim 18 in which said cleaning cycle is initiated by the controller subsystem after less than two hundred deposition/stripping cycles.

20. The system of claim 14 in which the said first cathodic potential is a pulsed cathodic potential.

21. The system of claim 14 in which the said second anodic potential is a pulsed anodic potential.

22. A electrochemical mirror system for reversibly controlling the propagation of electromagnetic radiation, the system comprising:
 a first electrode transmissive substrate which is substantially transparent to the electromagnetic radiation;
 a second electrode;
 an electrolyte containing metal ions between the pair of electrodes; and
 a controller subsystem configured to:
  apply a first potential across the electrodes to cause the metal ions from the electrolyte to electrodeposit a mirror film on the first electrode transmissive substrate,
  apply a second potential across the electrodes to oxidize and strip the metallic mirror film from the first electrode transmissive electrode, and
  after a plurality of deposition and stripping cycles, automatically initiating cleaning cycle to remove undissolved reflective material on said first electrode by applying a third potential across the electrodes which is increased to a fourth potential and then decreased back to the third potential.

* * * * *